(12) United States Patent
Yuan et al.

(10) Patent No.: US 9,970,417 B2
(45) Date of Patent: May 15, 2018

(54) WIND CONVERTER CONTROL FOR WEAK GRID

(71) Applicant: General Electric Company, Schenectady, NY (US)

(72) Inventors: Zhihui Yuan, Garching bei München (DE); Robert Roesner, Garching bei München (DE); Stefan Schroeder, Garching bei München (DE); Ara Panosyan, Garching bei München (DE); Krishna Kumar Anaparthi, Garching bei München (DE)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 14 days.

(21) Appl. No.: 15/098,929

(22) Filed: Apr. 14, 2016

(65) Prior Publication Data

US 2017/0302204 A1    Oct. 19, 2017

(51) Int. Cl.
*F03D 9/00* (2016.01)
*H02P 9/04* (2006.01)

(52) U.S. Cl.
CPC ............ *F03D 9/005* (2013.01); *F03D 9/003* (2013.01); *H02P 9/04* (2013.01)

(58) Field of Classification Search
USPC .................................................. 290/44, 55
See application file for complete search history.

(56) References Cited

U.S. PATENT DOCUMENTS

| 4,160,170 A * | 7/1979 | Harner | F03D 7/0224 |
| | | | 290/44 |
| 4,161,658 A * | 7/1979 | Patrick | F03D 7/0224 |
| | | | 290/44 |

(Continued)

FOREIGN PATENT DOCUMENTS

DE    102013208410 A1    11/2014
EP       2485358 A1     8/2012

(Continued)

OTHER PUBLICATIONS

Chen et al., "Comparison of methods for implementing virtual synchronous machine on inverters", European Association for the Development of Renewable Energies, Environment and Power Quality, International Conference on Renewable Energies and Power Quality, pp. 6, Mar. 28 to 30, 2012, Spain.

(Continued)

*Primary Examiner* — Pedro J Cuevas
(74) *Attorney, Agent, or Firm* — Nitin N. Joshi

(57) ABSTRACT

This disclosure relates to systems and methods for controlling a wind converter for a weak electrical grid. In one embodiment of the disclosure, a system for controlling the wind converter includes a wind converter connected to an electrical grid at a point of connection (POC) and operable to transfer a power to the electrical grid. The system includes a first control loop operable to calculate, based on electrical grid parameters and wind converter characteristics, a voltage reference to be generated by the wind converter. The system includes a second control loop to convert, based on the (Continued)

electrical grid parameters, the voltage reference into a current reference. The second loop converts the angle information of the voltage reference into a voltage at the POC. The system includes a third control to regulate, based at least on the current reference, the power transferred by the wind converter to the electrical grid.

19 Claims, 8 Drawing Sheets

(56) References Cited

U.S. PATENT DOCUMENTS

| | | | | |
|---|---|---|---|---|
| 4,189,648 | A * | 2/1980 | Harner | F03D 7/0224 290/44 |
| 4,435,647 | A * | 3/1984 | Harner | F03D 7/0224 290/44 |
| 5,798,633 | A | 8/1998 | Larsen et al. | |
| 6,639,328 | B2 * | 10/2003 | Wacknov | F01D 15/10 290/52 |
| 6,787,933 | B2 * | 9/2004 | Claude | H02P 9/04 290/52 |
| 6,812,586 | B2 * | 11/2004 | Wacknov | H02P 9/04 290/40 B |
| 6,812,587 | B2 * | 11/2004 | Gilbreth | F01D 15/10 290/1 A |
| 6,850,821 | B2 * | 2/2005 | Weitkamp | F03D 7/0276 114/39.3 |
| 7,095,597 | B1 | 8/2006 | Cousineau | |
| 7,215,035 | B2 * | 5/2007 | Hudson | H02P 9/48 290/44 |
| 7,411,309 | B2 * | 8/2008 | Hudson | F03D 7/0272 290/44 |
| 7,525,824 | B2 | 4/2009 | Veenstra | |
| 7,800,243 | B2 * | 9/2010 | Bendixen | F03D 7/0272 290/44 |
| 7,880,419 | B2 * | 2/2011 | Sihler | H02M 3/158 318/504 |
| 7,966,103 | B2 * | 6/2011 | Jorgensen | F03D 7/0224 290/44 |
| 8,008,793 | B2 * | 8/2011 | Andresen | F03D 7/0272 290/44 |
| 8,030,791 | B2 * | 10/2011 | Lang | H02M 5/4505 290/43 |
| 8,253,393 | B2 * | 8/2012 | Bo | F03D 7/0272 290/44 |
| RE43,698 | E * | 10/2012 | Hudson | F03D 7/0272 290/44 |
| 8,342,805 | B2 * | 1/2013 | Mendez Hernandez | F01D 11/00 244/1 A |
| 8,350,397 | B2 * | 1/2013 | Lang | H02M 5/4505 290/44 |
| 8,441,820 | B2 * | 5/2013 | Shen | H02M 7/487 363/131 |
| 8,503,443 | B2 * | 8/2013 | Lovmand | F03D 7/047 290/44 |
| 8,510,090 | B2 | 8/2013 | Hesse et al. | |
| 8,532,828 | B2 * | 9/2013 | Schramm | F16H 57/0006 381/71.1 |
| 8,575,773 | B2 * | 11/2013 | Tripathi | H02P 9/12 290/44 |
| 8,638,786 | B2 * | 1/2014 | Lovmand | F03D 7/047 290/44 |
| 8,655,495 | B2 | 2/2014 | Garcia | |
| 8,772,965 | B2 * | 7/2014 | El-Barbari | H02J 3/383 307/71 |
| 8,860,236 | B2 * | 10/2014 | Nasiri | F03D 7/0272 290/44 |
| 8,880,236 | B2 | 11/2014 | Weiss et al. | |
| 8,907,509 | B2 | 12/2014 | Brogan et al. | |
| 8,922,043 | B1 * | 12/2014 | Kang | F03D 7/0284 290/44 |
| 8,922,054 | B2 * | 12/2014 | Sihler | H02J 3/32 307/19 |
| 9,057,356 | B2 * | 6/2015 | Bech | F03D 9/005 |
| 9,091,245 | B2 * | 7/2015 | Lobato Pena | H02J 3/386 |
| 9,190,845 | B2 * | 11/2015 | Nelson | H02J 3/386 |
| 9,217,419 | B2 * | 12/2015 | Kang | F03D 7/048 |
| 9,243,613 | B2 * | 1/2016 | Yin | F03D 7/028 |
| 9,246,407 | B2 * | 1/2016 | Schroeder | H02M 7/483 |
| 9,419,536 | B2 * | 8/2016 | Wijekoon | H02M 1/12 |
| 9,450,412 | B2 * | 9/2016 | Schroeder | H02J 3/36 |
| 9,520,819 | B2 * | 12/2016 | Barker | H02M 5/42 |
| 9,537,301 | B1 * | 1/2017 | Schroeder | H02H 7/067 |
| 9,541,062 | B2 * | 1/2017 | Yin | F03D 7/0284 |
| 9,541,063 | B2 * | 1/2017 | Yin | G05B 13/021 |
| 9,556,853 | B2 * | 1/2017 | Gupta | H02J 3/16 |
| 9,600,004 | B2 * | 3/2017 | Baerthlein | G05F 1/14 |
| 9,634,576 | B2 * | 4/2017 | Shen | H02M 7/487 |
| 9,677,544 | B2 * | 6/2017 | Li | F03D 9/257 |
| 2002/0000723 | A1 * | 1/2002 | Weitkamp | F03D 7/0276 290/44 |
| 2002/0096959 | A1 * | 7/2002 | Qin | H02K 3/14 310/208 |
| 2002/0163819 | A1 * | 11/2002 | Treece | F02B 43/10 363/34 |
| 2002/0175522 | A1 * | 11/2002 | Wacknov | H02P 9/04 290/52 |
| 2002/0195821 | A1 * | 12/2002 | Wacknov | F01D 15/10 290/12 |
| 2003/0015873 | A1 * | 1/2003 | Khalizadeh | H02P 9/04 290/7 |
| 2003/0111842 | A1 * | 6/2003 | Gilbreth | F01D 15/10 290/52 |
| 2003/0127862 | A1 * | 7/2003 | Weitkamp | F03D 7/0276 290/44 |
| 2004/0119292 | A1 * | 6/2004 | Datta | F03D 7/0272 290/44 |
| 2004/0135436 | A1 * | 7/2004 | Gilbreth | H02J 1/10 307/18 |
| 2006/0186670 | A1 * | 8/2006 | Hudson | H02P 9/48 290/44 |
| 2007/0052244 | A1 * | 3/2007 | Hudson | F03D 7/0272 290/44 |
| 2008/0123373 | A1 * | 5/2008 | Roesner | H02M 3/155 363/65 |
| 2009/0021013 | A1 * | 1/2009 | Andresen | F03D 7/0272 290/44 |
| 2009/0021020 | A1 * | 1/2009 | Andresen | H02P 9/305 290/55 |
| 2009/0146603 | A1 * | 6/2009 | Sihler | H02M 3/158 318/812 |
| 2009/0149999 | A1 * | 6/2009 | Schramm | F16H 57/0006 700/280 |
| 2010/0025995 | A1 * | 2/2010 | Lang | H02M 5/4505 290/44 |
| 2010/0045040 | A1 * | 2/2010 | Bendixen | F03D 7/0272 290/44 |
| 2010/0237834 | A1 | 9/2010 | Alonso Sadaba et al. | |
| 2010/0329881 | A1 * | 12/2010 | Mendez Hernandez | F01D 11/00 416/230 |
| 2011/0049903 | A1 * | 3/2011 | Jorgensen | F03D 7/0224 290/55 |
| 2011/0089693 | A1 * | 4/2011 | Nasiri | F03D 7/0272 290/44 |
| 2011/0141786 | A1 * | 6/2011 | Shen | H02M 7/487 363/131 |
| 2011/0175354 | A1 * | 7/2011 | Bo | F03D 7/0272 290/44 |
| 2011/0316342 | A1 * | 12/2011 | El-Barbari | H02J 3/383 307/77 |
| 2012/0161518 | A1 * | 6/2012 | Schroeder | H02J 3/36 307/36 |
| 2012/0211983 | A1 * | 8/2012 | Tripathi | H02P 9/12 290/44 |
| 2012/0306277 | A1 | 12/2012 | Garcia | |

(56) References Cited

U.S. PATENT DOCUMENTS

| | | | |
|---|---|---|---|
| 2013/0015660 A1* | 1/2013 | Hesselbæk | H02J 3/16 290/44 |
| 2013/0026831 A1* | 1/2013 | Sihler | H02J 3/32 307/19 |
| 2013/0140820 A1 | 6/2013 | Tarnowski | |
| 2013/0161951 A1* | 6/2013 | Bech | F03D 9/005 290/44 |
| 2013/0168963 A1* | 7/2013 | Garcia | H02J 3/18 290/44 |
| 2013/0264824 A1 | 10/2013 | Gupta et al. | |
| 2013/0272844 A1* | 10/2013 | Lobato Pena | H02J 3/386 415/1 |
| 2013/0277972 A1* | 10/2013 | Lovmand | F03D 7/047 290/44 |
| 2014/0021720 A1* | 1/2014 | Nelson | H02J 3/386 290/44 |
| 2014/0159367 A1* | 6/2014 | Yin | F03D 7/028 290/44 |
| 2014/0293667 A1* | 10/2014 | Schroeder | H02M 7/483 363/60 |
| 2014/0300108 A1 | 10/2014 | Sahukari et al. | |
| 2015/0008750 A1* | 1/2015 | Shen | H02M 7/487 307/82 |
| 2015/0035284 A1* | 2/2015 | Yang | H02M 5/42 290/55 |
| 2015/0042094 A1 | 2/2015 | Beekmann | |
| 2015/0130187 A1* | 5/2015 | Yin | G05B 13/021 290/44 |
| 2015/0137518 A1 | 5/2015 | Yin et al. | |
| 2015/0137519 A1 | 5/2015 | Tarnowski | |
| 2015/0249402 A1* | 9/2015 | Wijekoon | H02M 1/12 363/45 |
| 2015/0249416 A1* | 9/2015 | Barker | H02M 5/42 290/44 |
| 2015/0295488 A1* | 10/2015 | Shen | H02H 3/006 363/50 |
| 2015/0322921 A1* | 11/2015 | Li | F03D 7/048 290/44 |
| 2015/0337808 A1* | 11/2015 | Kang | F03D 7/048 290/44 |
| 2015/0357819 A1* | 12/2015 | Pineda Amo | H02J 3/16 290/44 |
| 2015/0361954 A1* | 12/2015 | Nelson | G05B 15/02 700/287 |
| 2015/0369217 A1* | 12/2015 | Gupta | H02J 3/16 290/44 |
| 2016/0069324 A1* | 3/2016 | Busker | F03D 7/0284 290/44 |
| 2016/0087445 A1* | 3/2016 | Beekmann | H02J 3/386 307/52 |
| 2016/0111883 A1* | 4/2016 | Beekmann | F03D 7/048 307/82 |
| 2016/0131109 A1* | 5/2016 | Busker | F03D 7/048 290/44 |
| 2016/0139651 A1* | 5/2016 | Schramm | G06F 1/3287 713/323 |
| 2016/0149507 A1* | 5/2016 | Lei | H02M 1/12 363/35 |
| 2016/0231756 A1* | 8/2016 | Baerthlein | G05F 1/14 |
| 2016/0245259 A1* | 8/2016 | Gupta | F03D 7/0284 |
| 2016/0252941 A1* | 9/2016 | Yuan | G06F 1/263 |
| 2016/0254769 A1* | 9/2016 | Ren | H02P 9/105 290/44 |
| 2016/0359365 A1* | 12/2016 | Schroeder | H02J 3/36 |
| 2017/0025855 A1* | 1/2017 | Garcia | H02J 3/16 |

FOREIGN PATENT DOCUMENTS

| | | |
|---|---|---|
| EP | 2492500 A1 | 8/2012 |
| EP | 2551515 A1 | 1/2013 |
| EP | 2605356 A1 | 6/2013 |
| EP | 2662944 A1 | 11/2013 |
| EP | 2688172 A2 | 1/2014 |
| EP | 2711543 A1 | 3/2014 |
| EP | 2790312 A2 | 10/2014 |
| EP | 2793343 A1 | 10/2014 |
| EP | 2799944 A1 | 11/2014 |
| WO | 2011092193 A2 | 8/2011 |
| WO | 2012117132 A1 | 9/2012 |
| WO | 2013123433 A2 | 8/2013 |
| WO | 2013163266 A1 | 10/2013 |
| WO | 2013167140 A1 | 11/2013 |
| WO | 2014082642 A1 | 6/2014 |
| WO | 2015024583 A1 | 2/2015 |
| WO | 2015058769 A1 | 4/2015 |

OTHER PUBLICATIONS

Suul J A et al., "Extended stability range of weak grids with Voltage Source Converters through impedance-conditioned grid synchronization", AC and DC Power Transmission, 11th IET International Congerence on, pp. 1-10, Feb. 10-12, 2015, Birmingham.

Achilles et al., "Direct Drive Synchronous Machine Models for Stability Assessment of Wind Farms", pp. 9.

* cited by examiner

WIND CONVERTER CONTROL FOR WEAK GRID

TECHNICAL FIELD

The disclosure relates to transmitting electricity from renewable generation plants to electrical grids, and, more particularly, to systems and methods of controlling wind converters.

BACKGROUND

Wind farms are renewable energy generation plants. Wind farms can be located at remote locations far away from major electrical grids. Generally, wind farms need relatively long distance transmission lines and a single point of connection (POC) to an electrical grid. The impedance of a relatively long distance transmission line may be large enough to result in a low short circuit ratio (SCR). Thus, the relatively long distance of a transmission line between a wind farm and electrical grid can increase impedance and decrease the SCR.

For relatively strong energy generators, such as nuclear power plants and steam gas turbines, the SCR can be up to 100. For renewable energy generators, such as wind farms, the SCR is much lower. In certain instances, the recommended SCR for wind farms is at least 4. Typically, if the SCR for a wind farm falls below 4, operators of the electrical grid are warned that the wind farm cannot deliver sufficient power to the grid. If, for example, the SCR falls to 2, most wind farms cannot provide stable full power generation to the electrical grid. Thus, wind farms must have greater energy producing capacity in order to deliver stable power to an electrical grid.

SUMMARY OF THE DISCLOSURE

This disclosure relates to systems and methods of controlling wind converters. Certain embodiments of the disclosure can facilitate stabilizing power output of a wind farm providing power to a weak electrical grid.

According to one embodiment of the disclosure, a system for controlling a wind converter is provided. The system can include a wind converter. The wind converter can be connected to an electrical grid at a point of connection (POC). The wind converter can be operable to transfer power from a wind farm to the electrical grid. The system can include a first control loop. The first control loop can be operable to calculate, based on electrical grid parameters and wind converter characteristics, a voltage reference required to be generated by the wind converter. The system can further include a second control loop operable to convert, based on the electrical grid parameters, the voltage reference into a current reference. The current reference can be associated with angle information. The second control loop can convert the angle information into a voltage at the POC. The system can also include a third control loop operable to regulate, based at least on the current reference, the power transferred by the wind converter to the electrical grid.

In some embodiments of the disclosure, the third control loop is further operable to regulate the power based on the voltage at the POC. In certain embodiments of the disclosure, the third control loop is operable to regulate the power using a rotation frame reference. The rotation frame reference can be generated by a phase lock loop based on the voltage measured at the POC.

In some embodiments of the disclosure, the current reference includes at least one of an active current reference and a reactive current reference. In certain embodiments of the disclosure, the current reference corresponds to a power angle reference associated with the voltage at POC. In certain embodiments of the disclosure, electrical grid parameters can include a short circuit ratio and estimated voltage of the electrical grid. In certain embodiments of the disclosure, the wind converter characteristics can include a voltage magnitude at the POC and a DC link voltage of the wind converter. In certain embodiments of the disclosure, the first control loop is operable to calculate the voltage reference based at least on the POC voltage magnitude and the wind converter DC link voltage. In certain embodiments, the voltage reference can include a voltage of a direct current control of the wind converter.

According to another embodiment of the disclosure, a method for controlling a wind converter is provided. The method can include estimating parameters of an electrical grid. The electrical grid can be connected to the wind converter at a point of connection (POC). The wind converter can be operable to transfer power to the electrical grid. The method can allow acquiring characteristics of the wind converter. The method can also include calculating, based on the electrical grid parameters and the wind converter characteristics, a voltage reference to be generated by the wind converter. The method can also include translating the wind converter voltage reference into a current reference. The current reference can be associated with angle information. The method can further include translating the angle information into a voltage at the POC. The method can further allow regulating, based at least on the current reference, the power transferred by the wind converter to an electrical grid.

Other embodiments, systems, methods, features, and aspects will become apparent from the following description taken in conjunction with the following drawings.

The following detailed description includes references to the accompanying drawings, which form part of the detailed description. The drawings depict illustrations, in accordance with example embodiments. These example embodiments, which are also referred to herein as "examples," are described in enough detail to enable those skilled in the art to practice the present subject matter. The example embodiments may be combined, other embodiments may be utilized, or structural, logical, and electrical changes may be made, without departing from the scope of the claimed subject matter. The following detailed description is, therefore, not to be taken in a limiting sense, and the scope is defined by the appended claims and their equivalents.

DETAILED DESCRIPTION

Certain embodiments of the disclosure can include systems and methods for controlling a wind converter. The disclosed systems and methods can facilitate stabilizing power output of a wind farm connected to s relatively weak electrical grid.

In certain embodiments of the disclosure, a system for controlling a wind converter is provided. The system can include a wind converter. The wind converter can be connected to an electrical grid at a point of connection (POC). The wind converter can be operable to transfer power from a wind farm to the electrical grid. The system can include a first control loop. The first control loop can be operable to calculate, based on electrical grid parameters and wind converter characteristics, a voltage reference to be generated by the wind converter. The system can also include a second control loop operable to convert, based on the electrical grid parameters, the voltage reference into a current reference. The current reference can be associated with angle information. The second control loop may convert the angle information into a voltage at the POC. The system can also include a third control loop operable to regulate, based at least on the current reference, the power transferred by the wind converter to the electrical grid.

Technical effects of certain embodiments of the disclosure may include providing stable power transfer from a wind farm to an electrical grid in relatively weak electrical grid conditions. Further technical effects of certain embodiments of the disclosure may allow stabilizing power transfer from a wind converter to an electrical grid when a voltage at a point of connection between the wind converter and the electrical grid experiences instability. Certain technical effects of certain embodiments of the disclosure may provide stable power transfer from the wind converter at a relatively low SCR of transmission line between the wind farm and electrical grid.

The following provides a detailed description of various example embodiments related to systems and methods of controlling a wind converter.

Figure 1:
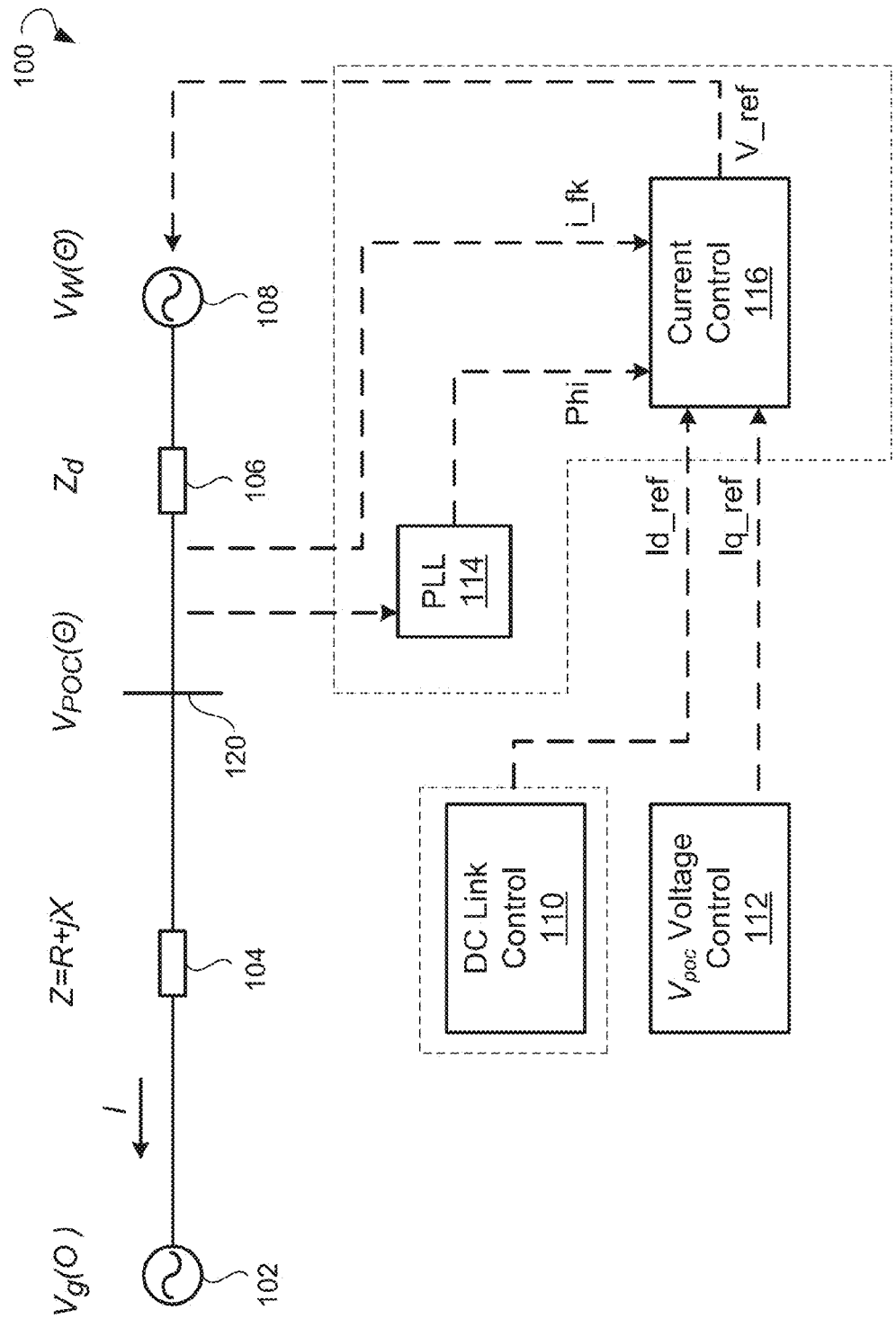
FIG. 1 is a block diagram illustrating an example wind converter control according to certain embodiments of the disclosure.

Turning now to the drawings, FIG. 1 is a block diagram illustrating an existing system 100 for controlling a wind converter. The system 100 may include a phase-locked loop (PLL) 114, a current control 116, a DC link control 110, and a voltage control 112. The system 100 can be operable to control a wind converter (also referred to as inverter) of a wind farm 108. The wind farm 108 can be operable to generate and provide power to electrical grid 102. The wind farm 108 can be connected to the grid at a POC 120. Typically, the POC 120 is located proximate to the wind farm 108. A transmission line connecting POC 120 and electrical grid 102 may be characterized by impedance 104 (Z). A transformer located between each wind turbine of wind farm 108 and POC 120 may be characterized by an impedance 106 ($Z_d$).

Certain embodiments of the disclosure can facilitate transferring power from a wind turbine of a wind farm, such as 108, to an electrical grid, such as 102, to maximize power generated by the wind farm 108 and fed to the electrical grid 102 within the voltage limits of the electrical grid 102. Example embodiments of the system 100 can account for differences in a voltage at the POC to align the phases. The PLL 114 can track the voltage at the POC and provide the voltage as a feedback to the wind farm 108 via current control 116. The current control 116 can force the wind farm 108 to deliver an amount of the maximum power at the voltage variations within limits of the electrical grid 102.

System 100 of FIG. 1 can be operable to facilitate current control through, for example, two loops including an active power loop and a reactive power loop. The active power loop can be defined through a DC bus voltage within the wind converter. If more wind power is supplied by the wind turbine of the wind farm, a DC link voltage increases. In order to reduce the voltage at the DC link, DC link control 110 can push the power into the electrical grid.

When a different amount of power is provided by the wind farm to the electrical grid, the voltage at the POC 120 can increase or decrease. If the voltage decreases, the reactive power loop can inject reactive power to improve the voltage profile. If the voltage at the POC increases, the reactive power is reduced.

The controls via the active power loop and the reactive power loop can be performed on site at the wind turbine and at the wind farm level using a wind farm management system. The controls via the active power loop and the reactive power loop can reside at each turbine. If, for example, a wind farm includes 100 wind turbines, each wind turbine can include an active power loop and reactive loop located at the turbine level. The wind farm management can be located at the POC and set difference points for each turbine.

The system 100 can be designed to operate under an assumption that a voltage at the POC is relatively stable and independent of a change of a load of the electrical grid. It may also be assumed that the power angle between the electrical grid and the wind farm is relatively small, so that an active power current reference $I_{d\_ref}$ and a reactive power current reference $I_{q\_ref}$ have an approximately linear relationship with an active power and a reactive power, respectively.

For a relatively low short circuit situation, the voltage at POC 120 may not be constant and may experience large fluctuations, so that disturbances at the electrical grid can change the voltage. Because the voltage at the POC 120 can vary considerably, the PLL 114 may not track the voltage due to a distortion in the voltage. In such situations, system 100 may not function adequately, thus, leading to relative instability of the wind control and a shutdown and/or a curtailment of power provided by the wind farm 108 may be needed to stabilize the system 100.

Figure 2:
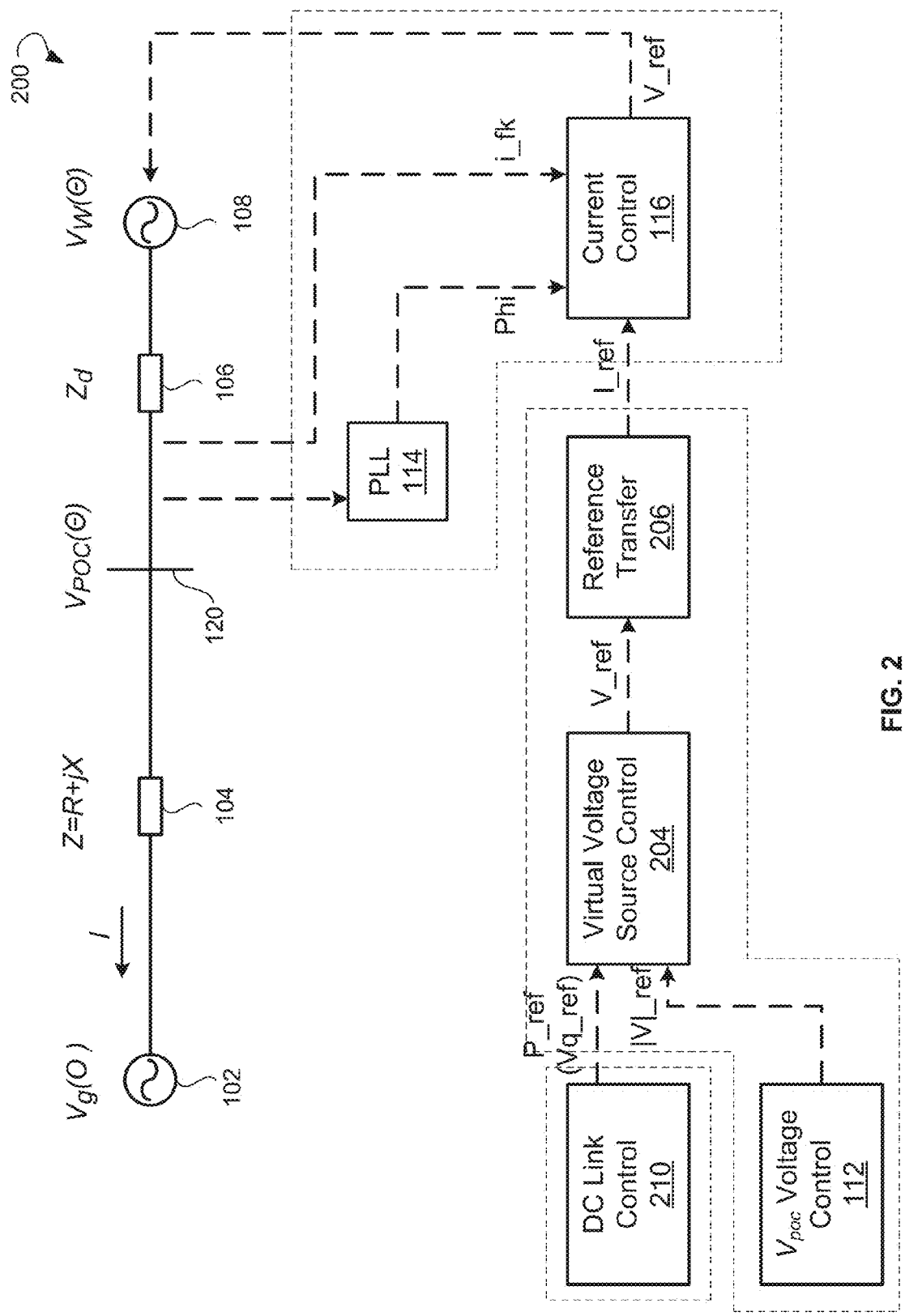
FIG. 2 is a block diagram illustrating an example system for wind converter control, according to certain embodiments of the disclosure.

FIG. 2 is a block diagram illustrating an example system 200 for controlling a wind converter, according to an embodiment of the disclosure. Similar to system 100 of FIG. 1, system 200 may include a phase-locked loop (PLL) 114, a current control 116, and a voltage control 112. The current control 116 can be operable to control a wind farm 108 by providing a voltage reference V_ref. The wind farm 108 can be operable to generate a current of certain voltage and provide the current to the electrical grid 102. The wind farm 108 can be connected to the electrical grid 102 at POC 120. A line connecting the POC 120 and electrical grid 102 may possess impedance 104 (Z). A transformer located between each wind turbine of wind farm 108 and the POC 120 may have impedance 106 ($Z_d$).

According to various examples of the disclosure and as compared to system 100 of FIG. 1, the system 200 of FIG. 2 may include, for instance, two additional controls: a virtual voltage source control 204 and a reference transfer control 206. The virtual voltage source control 204 can be operable to compensate the power angle difference between voltage $V_{POC}$ at POC 120 and voltage $V_g$ of the electrical grid 102. The reference transfer control 206 can be operable to keep linear behavior of the system 200 at all magnitudes of SCR.

According to certain example embodiments of the disclosure, the system 200 may include modified DC link control 210. The active power can be provided via a DC link control, and the reactive power control can be provided by the voltage control. In relatively strong grid conditions, there can be a strong decoupling of active power and reactive power. However, for a relatively low short circuit and weak grid conditions, the decoupling of the active power and reactive power may be relatively weak. In these conditions, the active power may be related to $V_q$ which is Q axis voltage and the active power may no longer be related to the D axis current and may be related to the Q axis current. For a relatively strong electrical grid situation, the D axis can refer to the active power control, and the Q axis can refer to the reactive power. For a relatively low SCR and a weak electrical grid condition, the reactive power may be related to the Q axis component of the voltage. Therefore, the active power loop and the reactive power loop may not be decoupled during relatively weak grid conditions. Therefore, the DC link control 210 is modified as compared to DC link 110 of the system 100 for wind control.

Figure 3:
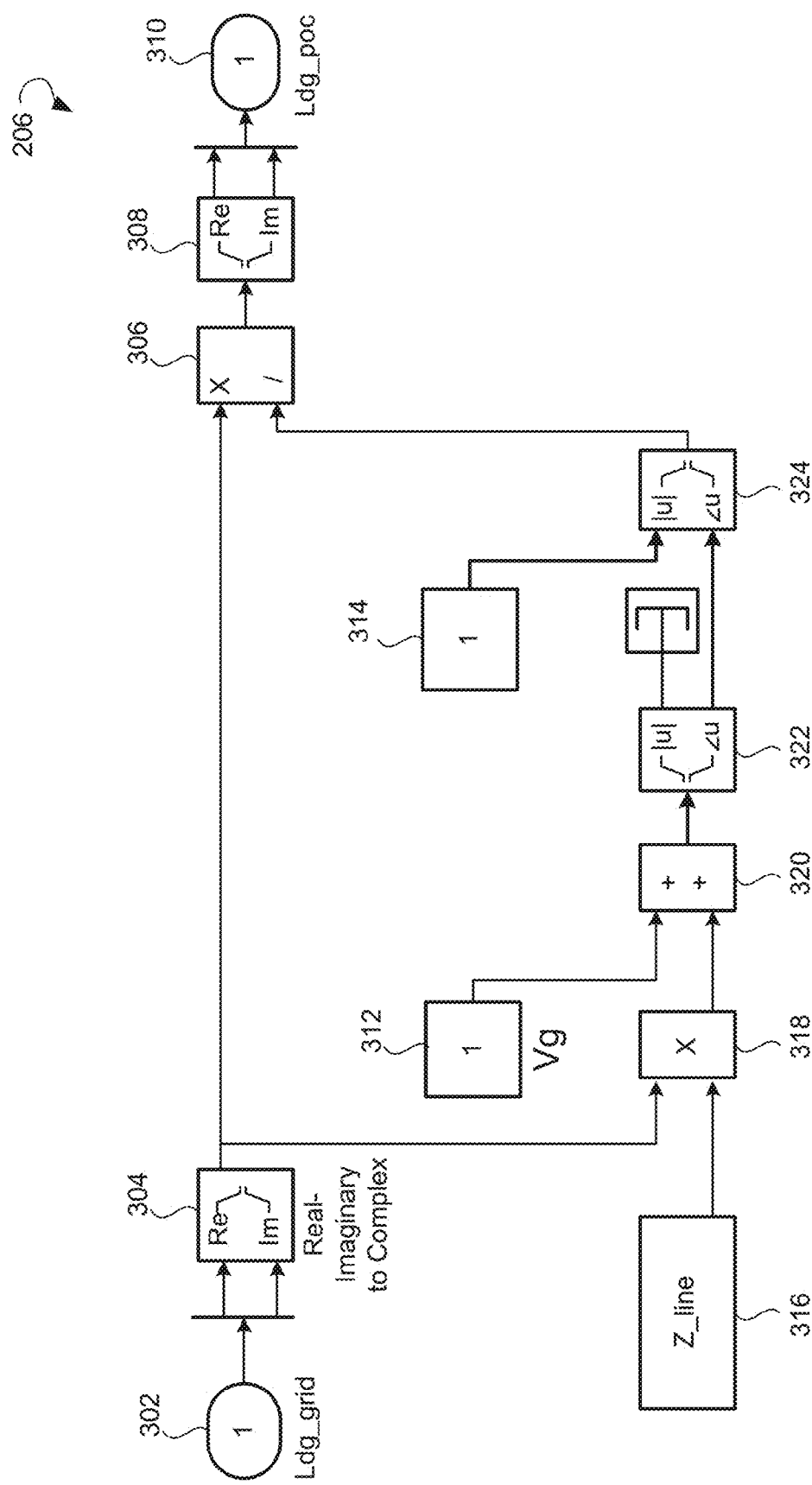
FIG. 3 is a block diagram illustrating an example reference transfer block, according to certain embodiments of the disclosure.

FIG. 3 is a block diagram illustrating an example reference transfer control 206, according to an embodiment of the disclosure. The reference transfer control 206 can include input blocks 302, 312, 314, and 316, and operational blocks 304, 306, 308, 318, 320, 322, and 324. In some embodiments of the disclosure, the reference transfer control 206 can be operable to generate a current control loop reference (denoted as "I_ref" in FIG. 2) using certain estimated electrical grid parameters and operation point references. The estimated electrical grid parameters can include the SCR and electrical grid voltage $V_g$. Inputs of the reference transfer block 206 can include an active power current reference $I_{d\_grid}$ and a reactive power current reference $I_{q\_grid}$ that are determined using electrical grid voltage $V_g$ as an angle reference. Outputs of the reference transfer block 206 can include an active power current reference $I_{d\_poc}$ and a reactive power current reference $I_{q\_poc}$ that correspond to POC voltage $V_{POC}$ as an angle reference.

In some embodiments of the disclosure, the reference transfer equations can include:

$$I_{dq\_POC} = I_{dq\_grid} r^{-angle(V_{POC})}$$

$$V_{POC} = I_{dq\_grid} * Z_{line} + |V_g|$$

where $Z_{line}$ is inversely proportional to SCR associated with the electrical grid.

Figure 4:
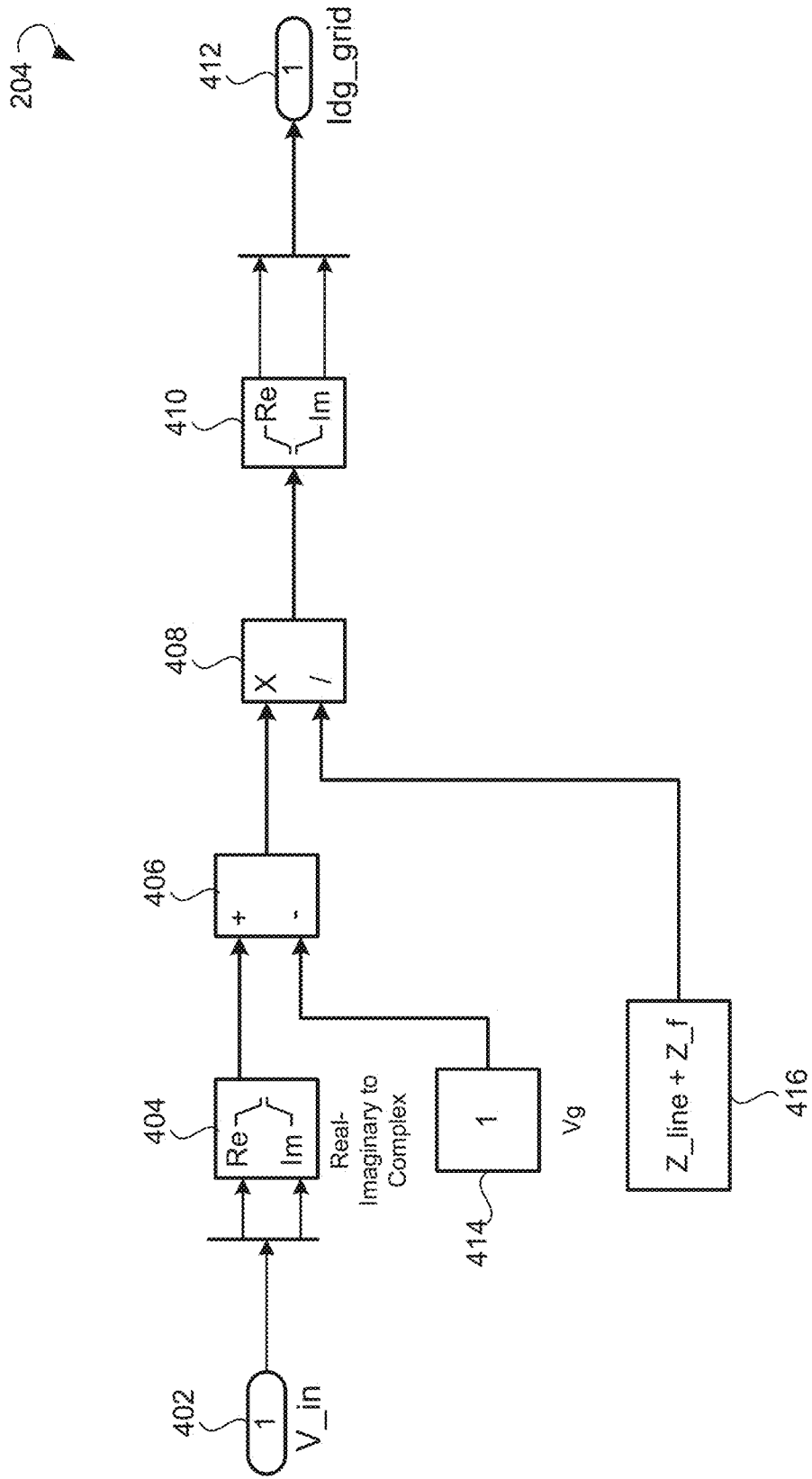
FIG. 4 is a block diagram illustrating an example virtual voltage source control, according to certain embodiments of the disclosure.

FIG. 4 is a block diagram illustrating an example virtual voltage source control 204, according to embodiment of the disclosure. The virtual voltage source control 204 can include input blocks 402, 414, and 416, output block 412, and operational blocks 404, 406, 408, and 410. In some embodiments of the disclosure, the virtual voltage source control 204 is operable to convert a voltage command into a current command using rough estimated electrical grid parameters and operation point references. The estimated electrical grid parameters can include a SCR, filter parameters $Z_{filter}$ related to impedance of transformer between wind turbine of wind farm and POC, and a voltage $V_g$ of the electrical grid. The operation point references can include active power voltage reference $V_{d\_ref}$ and reactive power voltage reference $V_{q\_ref}$. Inputs of the virtual voltage source control can include active power voltage reference $V_{d\_ref}$ and reactive power voltage reference $V_{q\_ref}$ associated with wind controller (inverter) and determined using an electrical grid voltage as angle reference. An output of the virtual voltage source control can include active power current reference $I_d$ and reactive power current reference $I_q$ determined using an electrical grid voltage as an angle reference.

Figure 5:
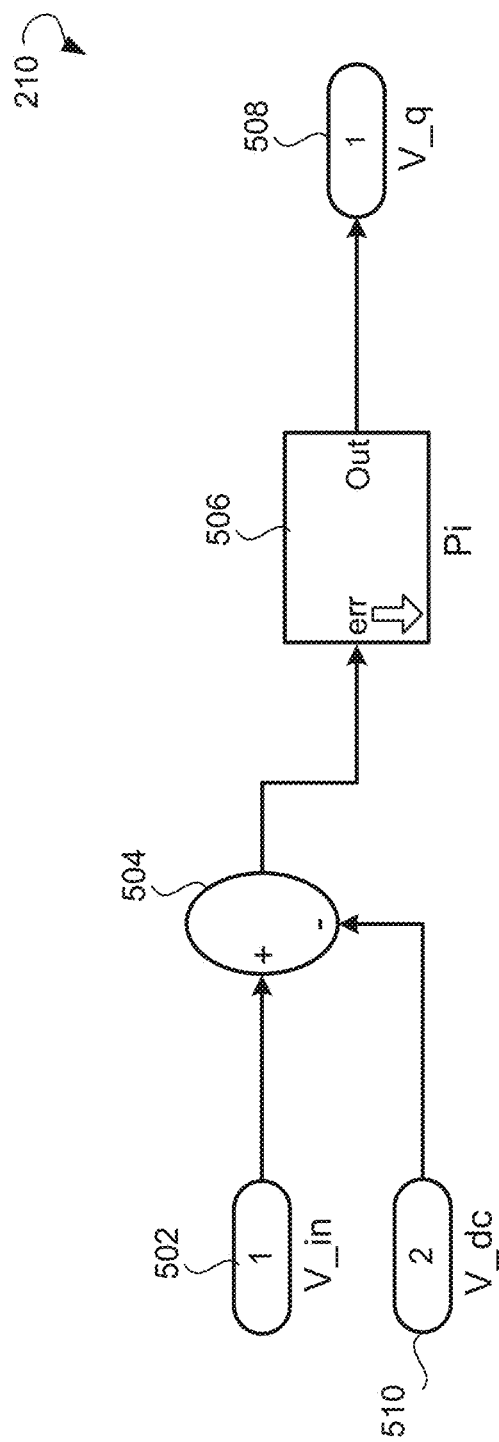
FIG. 5 is a block diagram illustrating an example DC (direct current) link control, according to certain embodiments of the disclosure.

FIG. 5 is a block diagram illustrating example DC link control 210 modified according to an embodiment of the disclosure. The DC link control 210 may include input blocks 502 and 510, a summation unit 504, a proportional and integral feedback (PI) controller 506, and an output block 508. In some embodiments of the disclosure, the DC link control 110 is operable to output a voltage reference $V_q$ of the wind converter using electrical grid voltage as an angle reference. Using DC link control 210 allows maintaining a linear relationship between an active power and the voltage reference $V_q$. A parameter P of PI controller can be defined in such a way that the DC link control 210 works for values of the SCR. Parameters P can be defined by formula:

$$P = \frac{|V_g||V_{inv}|\sin\theta}{|X_{line}|}$$

where $X_{line}$ is defined using an impedance of the transmission line $Z = R + jX_{line}$.

Figure 6:
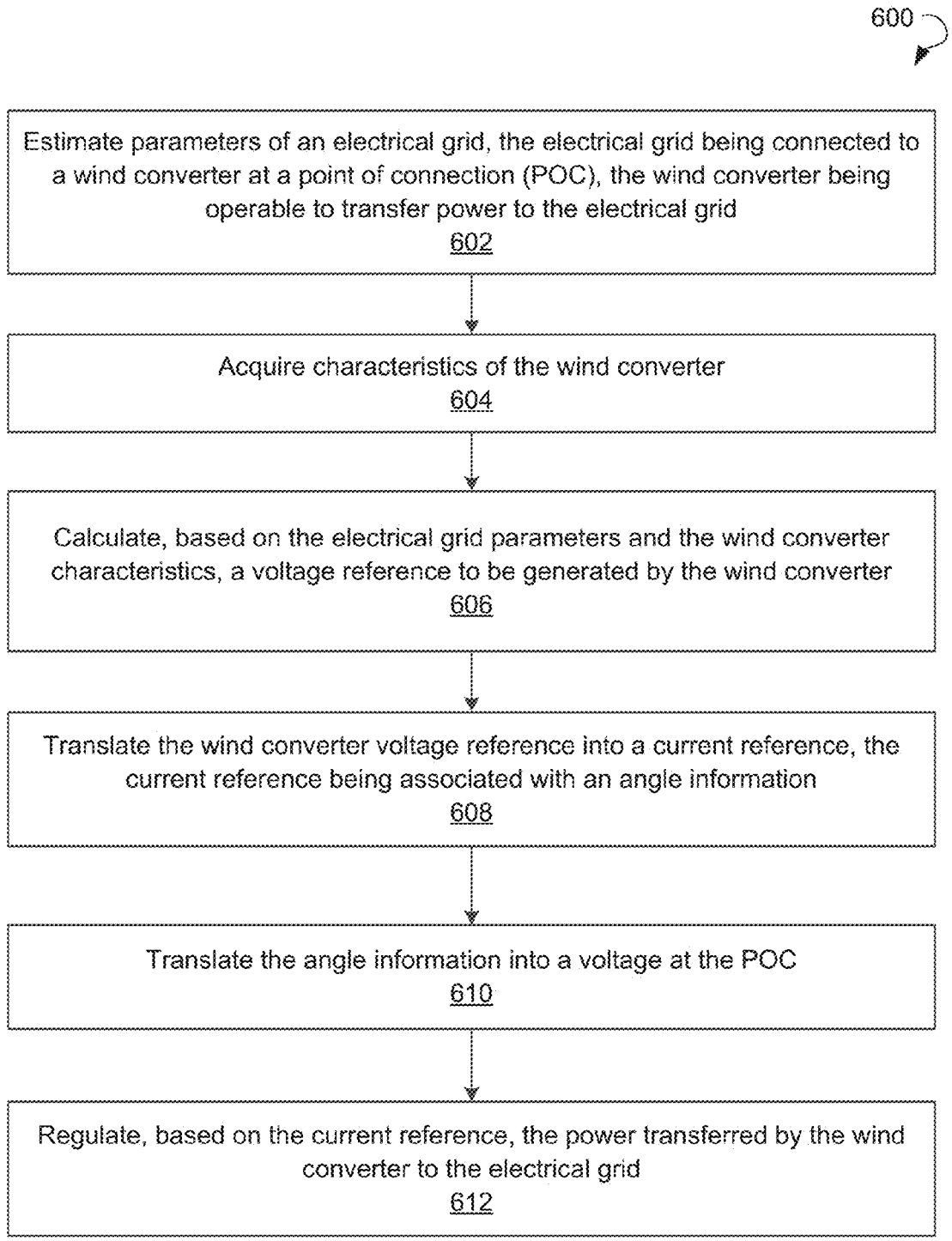
FIG. 6 is flow chart illustrating an example method for controlling a wind converter, according to certain embodiments of the disclosure.

FIG. 6 is a flow chart illustrating an example method 600 for controlling a wind converter, according to an embodiment of the disclosure. The method 600 can, for example, be implemented using system 200 for controlling a wind converter. The wind converter can be operable to transfer power to the electrical grid. The electrical grid can be connected to the wind converter at the POC.

In block 602, the system 200 may estimate parameters of an electrical grid. In some embodiments of the disclosure, the parameters of the electrical grid include a SCR and an electrical grid voltage. In block 604, the system 200 may acquire characteristics of the wind converter. In some embodiments of the disclosure, the wind converter characteristics can include a voltage magnitude at the POC and a DC link voltage of the wind converter.

In block 606, the virtual voltage source control 204 of the system 200 may calculate, based on the electrical grid parameters and the wind converter characteristics, a voltage reference required to be generated by the wind converter.

In block 608, the reference transfer control 206 of the system 200 may convert the wind converter voltage reference into a current reference. The current reference can be associated with angle information. In block 610, the reference transfer control 206 may convert the angle information to a voltage at the POC.

In block 612, the current control 116 of the system 200 may regulate, based at least on the current reference, the power transferred by the wind converter to an electrical grid. In some embodiment of the disclosure, the current control 116 is further operable to regulate the transferred power using a rotation frame reference. The rotation frame reference can be generated by a phase lock loop 114 based on the voltage at the POC.

Figure 7:
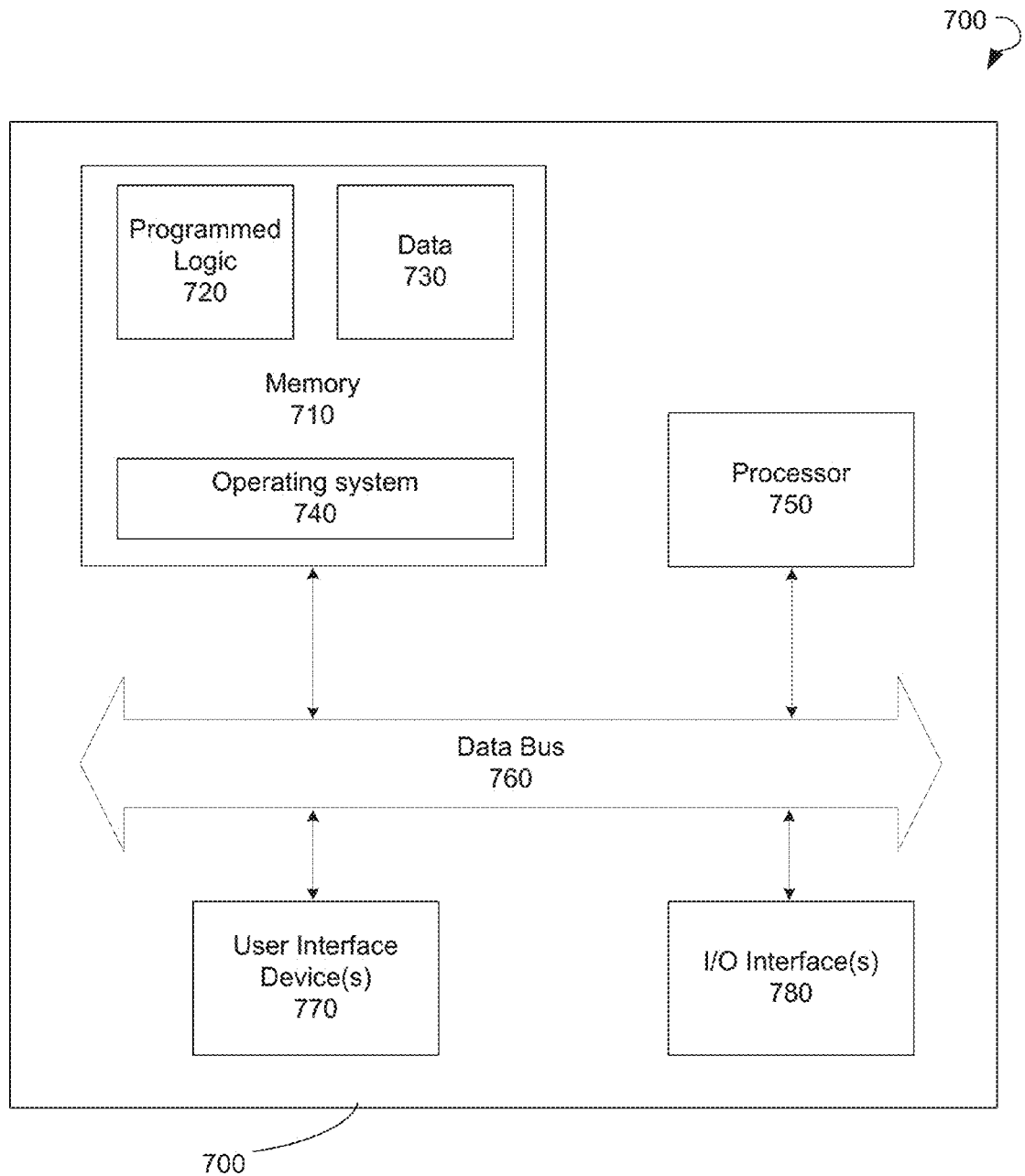
FIG. 7 is a block diagram illustrating an example controller for controlling a wind converter, in accordance with an embodiment of the disclosure.

FIG. 7 depicts a block diagram illustrating an example controller 1300 for controlling a wind converter, in accordance with an embodiment of the disclosure. The controller 700 may include a memory 710 that stores programmed logic 720 (e.g., software) and may store data 730, such as geometrical data and the operation data of a power plant, a dynamic model, performance metrics, and the like. The memory 710 also may include an operating system 740.

A processor 750 may utilize the operating system 740 to execute the programmed logic 720, and in doing so, may also utilize the data 730. A data bus 760 may provide communication between the memory 710 and the processor 750. Users may interface with the controller 700 via at least one user interface device 770, such as a keyboard, mouse, control panel, or any other devices capable of communicating data to and from the controller 700. The controller 700 may be in communication with the power plant online while operating, as well as in communication with the power plant offline while not operating, via an input/output (I/O) interface 780. More specifically, one or more of the controllers 700 may carry out the execution of the model-based control system, such as, but not limited to, receive geometrical data and operational data associated with components of the power plant, create a dynamic model of the power plant for components based on the geometrical data and the operation data, generate a surrogate model for a specific performance metric based on the dynamic model, incorporate the surrogate model into an optimization procedure, and exercise the optimization procedure under an optimization objective to optimize operations of the power plant for the specific performance metric. Additionally, it should be appreciated that other external devices or multiple other power plants may be in communication with the controller 700 via the I/O interface 780. In the illustrated embodiment, the controller 700 may be located remotely with respect to the power plant; however, it may be co-located or even integrated with the power plant. Further, the controller 700 and the programmed logic 720 implemented thereby may include software, hardware, firmware, or any combination thereof. It should also be appreciated that multiple controllers 700 may be used, whereby different features described herein may be executed on one or more different controllers 700.

Figure 8:
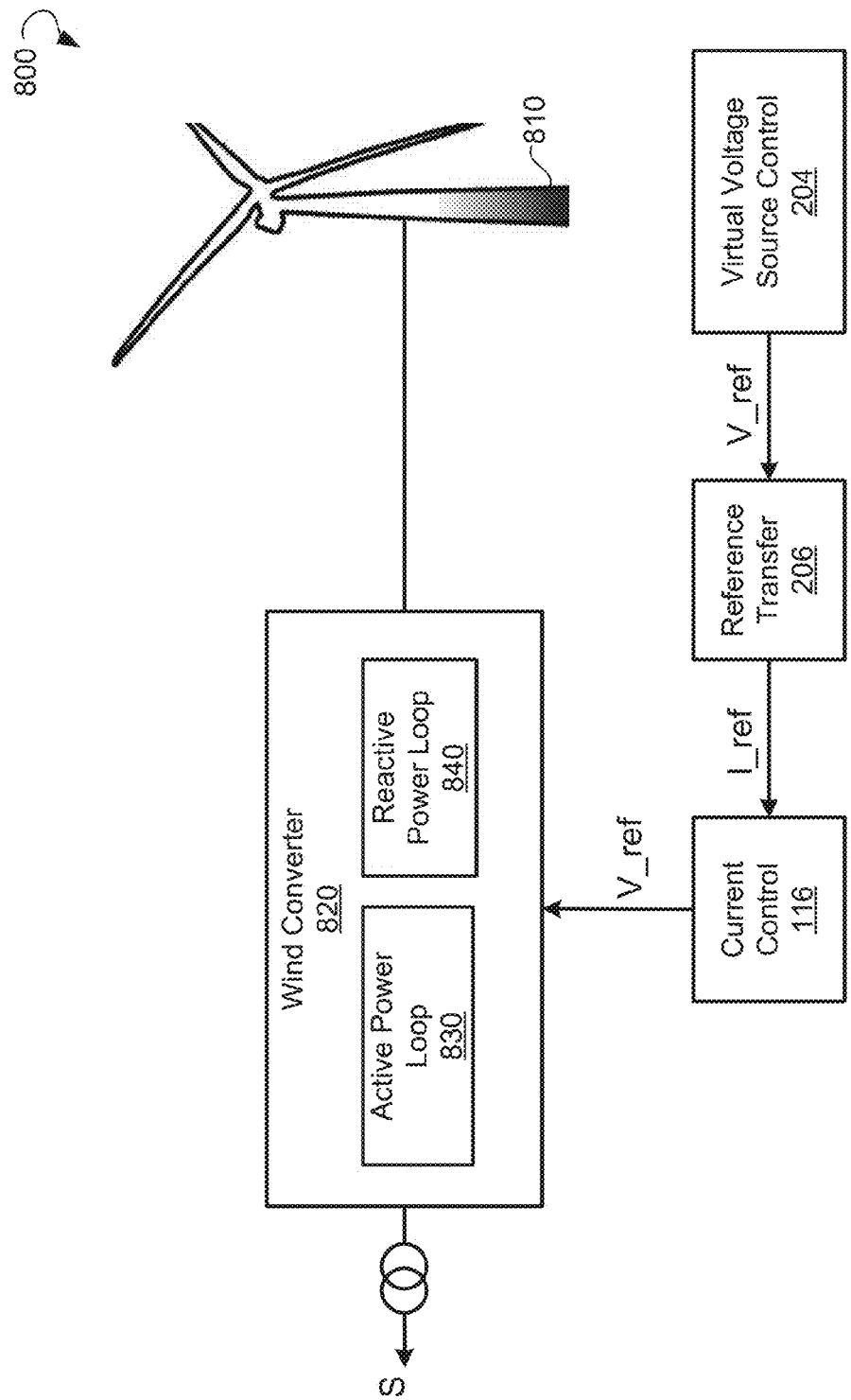
FIG. 8 is a block diagram illustrating an example environment in which example embodiments of this disclosure can be implemented.

FIG. 8 is a block diagram illustrating an example environment 800, in which embodiments of this disclosure can be implemented. The environment 800 may include at least one wind turbine 810 and a wind converter 820. The wind converter 820 may include an active power loop and a reactive power loop. The wind converter 820 may be operable to transfer power from the wind turbine to an electrical grid within limits of the electrical grid.

The environment 800 may further include a current control 116, a reference transfer control 206, and a virtual voltage control 204. According to some embodiments of the disclosure, virtual voltage control 204 may calculate a voltage reference to be generated by the wind controller 810. The voltage reference may be calculated based on electrical grid parameters and characteristics of the wind converter. The reference transfer control 206 may convert the voltage reference into a current reference and angle information at a POC between the wind converter 810 and the electrical grid. The angle information may be further converted into voltage at the POC. The current control 116 may use the current reference and the voltage at the POC to regulate power transferred by the wind converter 810 to the electrical grid.

Accordingly, certain embodiments described herein can allow for constrained, multi-objective simulation and optimization of operations of a power plant. The multi-objective optimization may be accomplished through the use of surrogate models in order to satisfy the function call requirements. However, the dynamic simulation of the power plant may also be executed in a time-efficient manner, i.e. on the order of minutes, in order to generate the data to regress. Due to the dynamic simulation of the power plant operation, optimal operation of the power plants may be achieved. Additionally, time history of performance metrics within the power plant may be predicted under a variety of operating conditions.

References are made to block diagrams of systems, methods, apparatuses, and computer program products according to example embodiments. It will be understood that at least some of the blocks of the block diagrams, and combinations of blocks in the block diagrams, may be implemented at least partially by computer program instructions. These computer program instructions may be loaded onto a general purpose computer, special purpose computer, special purpose hardware-based computer, or other programmable data processing apparatus to produce a machine, such that the instructions which execute on the computer or other programmable data processing apparatus create means for implementing the functionality of at least some of the blocks of the block diagrams, or combinations of blocks in the block diagrams discussed.

These computer program instructions may also be stored in a non-transitory, computer-readable memory that can direct a computer or other programmable data processing apparatus to function in a particular manner, such that the instructions stored in the computer-readable memory produce an article of manufacture including instruction means that implement the function specified in the block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide operations for implementing the functions specified in the block or blocks.

One or more components of the systems and one or more elements of the methods described herein may be implemented through an application program running on an operating system of a computer. They also may be practiced with other computer system configurations, including handheld devices, multiprocessor systems, microprocessor based or programmable consumer electronics, mini-computers, mainframe computers, and the like.

Application programs that are components of the systems and methods described herein may include routines, programs, components, data structures, and so forth that implement certain abstract data types and perform certain tasks or actions. In a distributed computing environment, the application program (in whole or in part) may be located in local memory or in other storage. In addition, or alternatively, the application program (in whole or in part) may be located in remote memory or in storage to allow for circumstances where tasks are performed by remote processing devices linked through a communications network.

Many modifications and other embodiments of the example descriptions set forth herein to which these descriptions pertain will come to mind having the benefit of the teachings presented in the foregoing descriptions and the associated drawings. Thus, it will be appreciated that the disclosure may be embodied in many forms and should not be limited to the example embodiments described above. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system comprising:
   a wind converter connected to an electrical grid at a point of connection (POC) and operable to transfer a power to the electrical grid;
   a first control loop operable to:
      calculate, based at least on electrical grid parameters and wind converter characteristics, a voltage reference to be generated by the wind converter;
   a second control loop operable to:
      convert, based at least on the electrical grid parameters, the voltage reference into a current reference, the current reference associated with an angle information; and
   a third control loop operable to regulate, based at least on the current reference, the power transferred by the wind converter to the electrical grid.

2. The system of claim 1, wherein:
   the second loop is further operable to convert the angle information into a voltage at the POC; and
   the third control loop is further operable to regulate the power based on the voltage at the POC.

3. The system of claim 2, wherein the third control loop is operable to regulate the power using a rotation frame reference generated by a phase lock loop based on the voltage at the POC.

4. The system of claim 1, wherein the electrical grid parameters include at least a short circuit ratio.

5. The system of claim 1, wherein the electrical grid parameters include an estimated voltage of the electrical grid.

6. The system of claim 1, wherein the wind converter characteristics include a voltage magnitude at the POC and a DC link voltage of the wind converter.

7. The system of claim 6, wherein the first control loop is operable to calculate the voltage reference based at least on the POC voltage magnitude and the wind converter DC link voltage.

8. The system of claim 1, wherein the current reference includes at least one of an active current reference and a reactive current reference.

9. The system of claim 1, wherein the current reference corresponds to a power angle reference associated with the voltage at POC.

10. A method for controlling a wind converter, the method comprising:
    estimating parameters of an electrical grid, the electrical grid being connected to the wind converter at a point of connection (POC) and the wind converter being operable to transfer a power to the electrical grid;
    acquiring characteristics of the wind converter;
    calculating, based at least on the electrical grid parameters and the wind converter characteristics, voltage reference to be generated by the wind converter;
    translating the wind converter voltage reference into a current reference, the current reference being associated with angle information;
    translating the angle information into a voltage at the POC; and
    regulating, based at least on the current reference, the power transferred by the wind converter to an electrical grid.

11. The method of claim 10, wherein the power is further regulated based on a rotation frame reference.

12. The method of claim 11, wherein the rotation frame reference is generated by a phase lock loop based on a voltage of the current measured at the POC.

13. The method of claim 10, wherein the estimated electrical grid parameters include at least a short circuit ratio.

14. The method of claim 10, wherein the estimated electrical grid parameters include at least an estimated voltage of the current of the electrical grid.

15. The method of claim 10, wherein the wind converter characteristics include a voltage magnitude at the POC and a DC link voltage of the wind converter.

16. The method of claim 15, wherein the first control loop is operable to calculate the voltage reference based at least on the POC voltage magnitude and the wind converter DC link voltage.

17. The method of claim 10, wherein the current reference includes at least one of an active current reference and a reactive current reference.

18. The method of claim 10, wherein the current reference corresponds to a power angle reference associated with the voltage at the POC.

19. A system comprising:
    a wind farm in communication with an electrical grid, the wind farm comprising at least one wind converter;
    the at least one wind converter connected to the electrical grid at a point of connection (POC) and operable to transfer a current to the electrical grid;
    a first control loop operable to:
       calculate, based at least on electrical grid parameters and wind converter characteristics, a voltage reference to be generated by the at least one wind converter, wherein the electrical grid parameters include a short circuit ratio and an estimated voltage of the electrical grid and the at least one wind converter characteristics include a voltage magnitude at the POC and a DC link voltage of the at least one wind converter;
    a second control loop operable to:
       convert, based at least on the electrical grid parameters, the voltage reference into a current reference, the current reference including at least one of an active current reference and a reactive current reference and associated with an angle information; and
       convert, the angle information into a voltage at the POC; and
    a third control loop operable to regulate, based at least on the current reference and a rotation frame reference, the power transferred by the at least one wind converter to the electrical grid, wherein the rotation frame reference is generated by a phase lock loop based at least on the voltage at the POC.

* * * * *